(12) United States Patent
Schiffmiller (10) Patent No.: US 10,830,865 B1
(45) Date of Patent: Nov. 10, 2020

(54) MULTI-SHIP COHERENT GEOLOCATION SYSTEM FOR AIRBORNE EMITTERS

(71) Applicant: BAE Systems Information and Electronic Systems Integration Inc., Nashua, NH (US)

(72) Inventor: Richard Schiffmiller, Teaneck, NJ (US)

(73) Assignee: BAE Systems Information and Electronic Systems Integregation Inc., Nashua, NH (US)

( * ) Notice: Subject to any disclaimer, the term of this patent is extended or adjusted under 35 U.S.C. 154(b) by 64 days.

(21) Appl. No.: 16/412,847

(22) Filed: May 15, 2019

(51) Int. Cl.
  *G01S 5/02* (2010.01)
  *G01S 11/10* (2006.01)
  *G01S 5/06* (2006.01)

(52) U.S. Cl.
  CPC .............. *G01S 5/0278* (2013.01); *G01S 5/06* (2013.01); *G01S 11/10* (2013.01)

(58) Field of Classification Search
  None
  See application file for complete search history.

(56) References Cited

U.S. PATENT DOCUMENTS

| | | | |
|---|---|---|---|
| 5,990,833 A * | 11/1999 | Ahlbom | G01S 3/50 342/417 |
| 6,100,845 A | 8/2000 | Rose | |
| 6,933,888 B1 * | 8/2005 | Schiffmiller | G01S 5/14 342/387 |
| 7,893,875 B1 | 2/2011 | Smith | |
| 8,587,467 B1 | 11/2013 | Zemany | |
| 10,440,677 B2 * | 10/2019 | O'Shea | H04W 24/10 |
| 2005/0275588 A1 * | 12/2005 | Schiffmiller | G01S 5/0252 342/387 |
| 2008/0186235 A1 * | 8/2008 | Struckman | G01S 5/0221 342/465 |

OTHER PUBLICATIONS

N. Okello, "Emitter Geolocation with Multiple UAVs," 2006 9th International Conference on Information Fusion, Florence, 2006, pp. 1-8, doi: 10.1109/ICIF.2006.301587. (Year: 2006).*
International Search Report, PCT/US20/32849, dated Aug. 19, 2020, 10 pages.

* cited by examiner

*Primary Examiner* — Gregory C. Issing
(74) *Attorney, Agent, or Firm* — Finch & Maloney PLLC; Scott J. Asmus (57) ABSTRACT

Techniques are provided for geolocation of an airborne radar emitting source. A methodology implementing the techniques according to an embodiment includes initializing a search grid with hypothesized emitter geolocations boxes of the grid. The method further includes refining geolocations based on calculated pulse repetition intervals of de-Dopplerized times of arrival (TOAs) of emitter pulses received at multiple collection platforms within a dwell period. A residue metric is employed to qualify candidate target geolocations based on differences between the measured TOAs and hypothesized TOAs associated with the refined geolocations. A candidate history tracks the geolocations of the candidates with the smallest residue over subsequent dwells, identifying such candidates that match locations in the history and updating counts of times the candidate has been matched. Candidates with lagging match counts are dropped from the history. The search grid size is reduced to encompass regions surrounding the viable candidates by a selected margin.

20 Claims, 9 Drawing Sheets

MULTI-SHIP COHERENT GEOLOCATION SYSTEM FOR AIRBORNE EMITTERS

FIELD OF DISCLOSURE

The present disclosure relates to geolocation, and more particularly, to geolocation of a pulsed waveform emitter of an airborne platform using coherent processing of data provided by two or more collection platforms.

BACKGROUND

Passive geolocation of other airborne radar emitters is a useful and important capability for an aircraft. Passive geolocation has the advantage of operating in a listening only mode which reduces risk of detection of the aircraft and allows for a less complex and more cost-effective system. Geolocation of airborne radar emitters is challenging, however, due to the relatively high speed at which the emitter can be traveling. Existing passive geolocation systems suffer from positional ambiguities in the geolocation estimates which can result in many potential location solutions. Additionally, these systems typically require lengthy data collection periods to provide geolocation results.

Although the following Detailed Description will proceed with reference being made to illustrative embodiments, many alternatives, modifications, and variations thereof will be apparent to those skilled in the art.

DETAILED DESCRIPTION

Techniques are provided for geolocation of an airborne pulsed radar emitter using coherent processing of radar pulses received by multiple spatially separated airborne collection platforms. The geolocation calculation is based on Doppler shifts of the pulse repetition intervals (PRIs) of the emitter waveform. In an embodiment, times of arrival (TOAs) of the emitter pulses are processed at multiple collection platforms as if a single platform had collected them all, thus creating a virtual motion of the collector at an extremely high velocity. This multi-ship collection approach enables accurate Doppler-based geolocation of an airborne emitter due to the fact that any motion of the emitter, in the radial direction towards the collector platforms, will be negligible in the relatively short time period between the multi-ship collections.

The geolocation accuracy achieved through multi-ship processing generally improves with increasing separation between the collector platforms, but unfortunately so also do the number of potential location solutions. That is to say, an increasing number of distinct and ambiguous location solutions can result as the collector platforms become more widely spaced, and only one of these solutions will be the true location. These ambiguous solutions arise as a function of the collector/emitter geometry even if there are no measurement errors. Thus, according to an embodiment of the present disclosure, techniques are further disclosed to qualify and track candidate locations over multiple radar dwell periods to eliminate or reduce ambiguous location solutions.

The disclosed techniques can be implemented, for example, in a computing system or a software product executable or otherwise controllable by such systems, although other embodiments will be apparent. In accordance with an embodiment, a methodology to implement these techniques includes initializing search grids with hypothesized emitter geolocations in each grid. The method further includes refining geolocations based on calculated PRIs of de-Dopplerized TOAs of emitter pulses received at multiple collection platforms within a radar dwell period. A residue metric is employed to qualify candidate target geolocations based on differences between the measured TOAs and hypothesized TOAs associated with the refined geolocations. A candidate history is maintained and updated to both: (1) track the geolocations of the candidates with the smallest residue over subsequent dwells; and (2) identify such candidates that are spatially close to existing candidates in the history. The method further includes updating the number of times the candidate has been matched. Candidates with lagging or otherwise insufficient match counts are dropped from the candidate history. The search grid used on each dwell period is reduced in size to encompass the smaller region surrounding the remaining viable candidates. One or more high-confidence candidates can then be selected and further appropriate action can be taken (e.g., continued tracking and/or engagement of aircraft; issue communication to aircraft; intercept aircraft, etc.).

It will be appreciated that the techniques described herein may provide improved geolocation capabilities for airborne emitter targets that can be traveling at relatively high velocities. The disclosed techniques can provide rapid location estimates, for example on the order of milliseconds, compared to existing techniques that often require data collection times on the order of tens of seconds. Other applications will be apparent. These techniques may further be implemented in hardware or software or a combination thereof.

Figure 1:
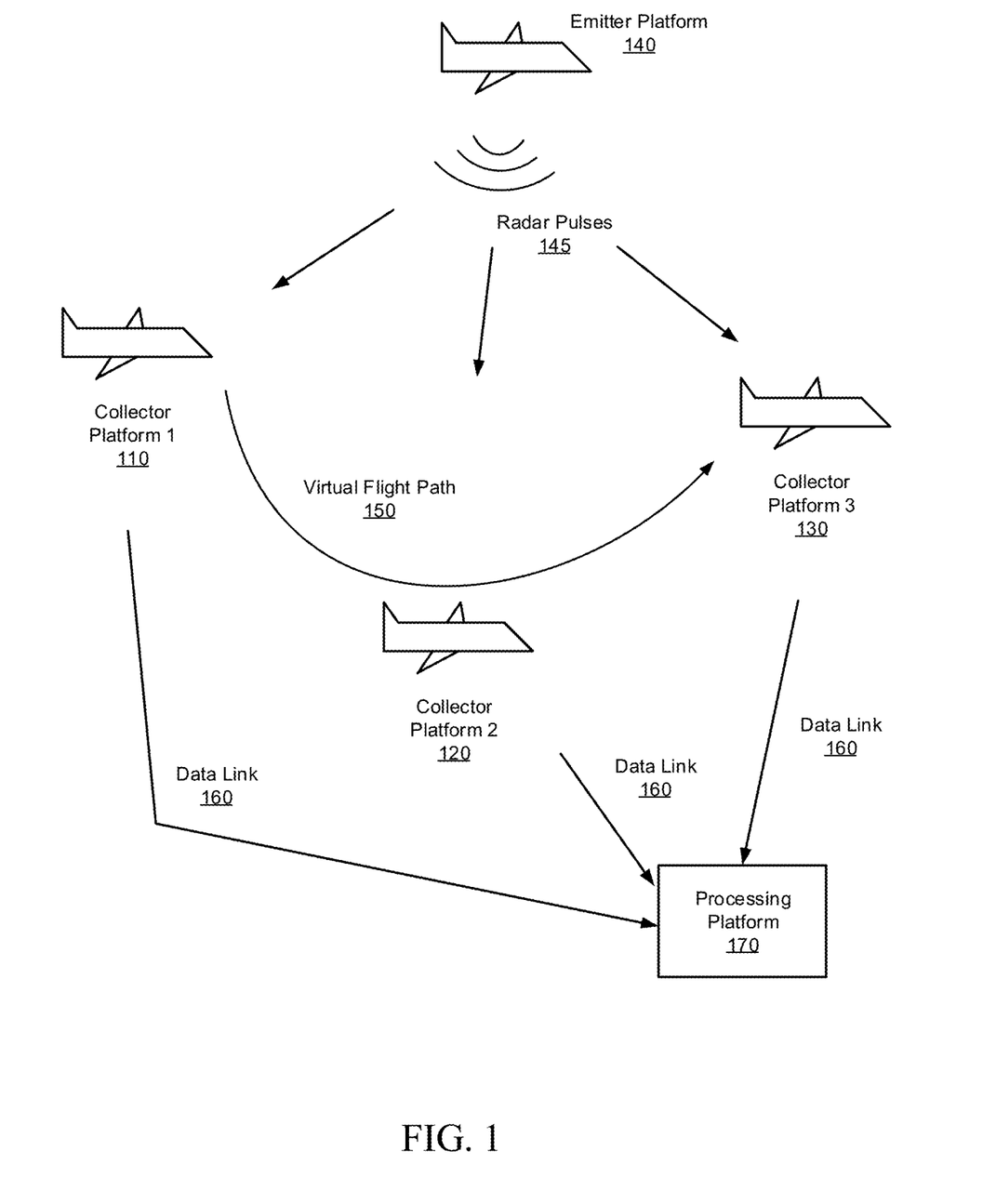
FIG. 1 illustrates a deployment of a geolocation system employing multiple airborne collector platforms, configured in accordance with certain embodiments of the present disclosure.

FIG. 1 illustrates a deployment 100 of a geolocation system employing multiple airborne collector platforms, such as an aircraft, drone or projectile, configured in accordance with certain embodiments of the present disclosure. This is referred to as multi-ship geolocation. Two or more airborne collector platforms 110, 120, . . . 130 are shown at distinct locations (e.g., spatially separated from one another) and in positions to receive pulsed radar waveforms 145 transmitted by an airborne emitter platform 140. The use of multiple collector platforms can be considered as equivalent to a single collector platform traveling along a virtual flight path 150 at a very high velocity to collect data at each of the locations at nearly instantaneous times.

A processing platform 170 is also shown, and is configured to perform the geolocation processing based on data supplied by the collector platforms. In some embodiments, the processing platform 170 may be a ground-based system, or it may be hosted on one or more of the collector platforms. In any event, the data is transmitted between the collector platforms and the processing platform over data links 160. The data includes times of arrival (TOAs) of the pulsed radar waveforms 145 received at the collector platforms, as well as information about the location of the collector platforms at the time that the radar pulse is received at that platform. An inertial navigation system (INS) on the collector platform (which may employ, for example, a global positioning system or GPS) may be used to obtain the location of the collector platform with relatively high accuracy. A time synchronization circuit may be used to maintain time registration between the INS and TOA measurement circuitry on each platform and among each of the collector platforms and the processing platform. Since a relatively small amount of data needs to be transmitted between the collectors and the processing platform, a low speed communication link (e.g., on the order of 100 KB/sec) may be employed.

Figure 3:
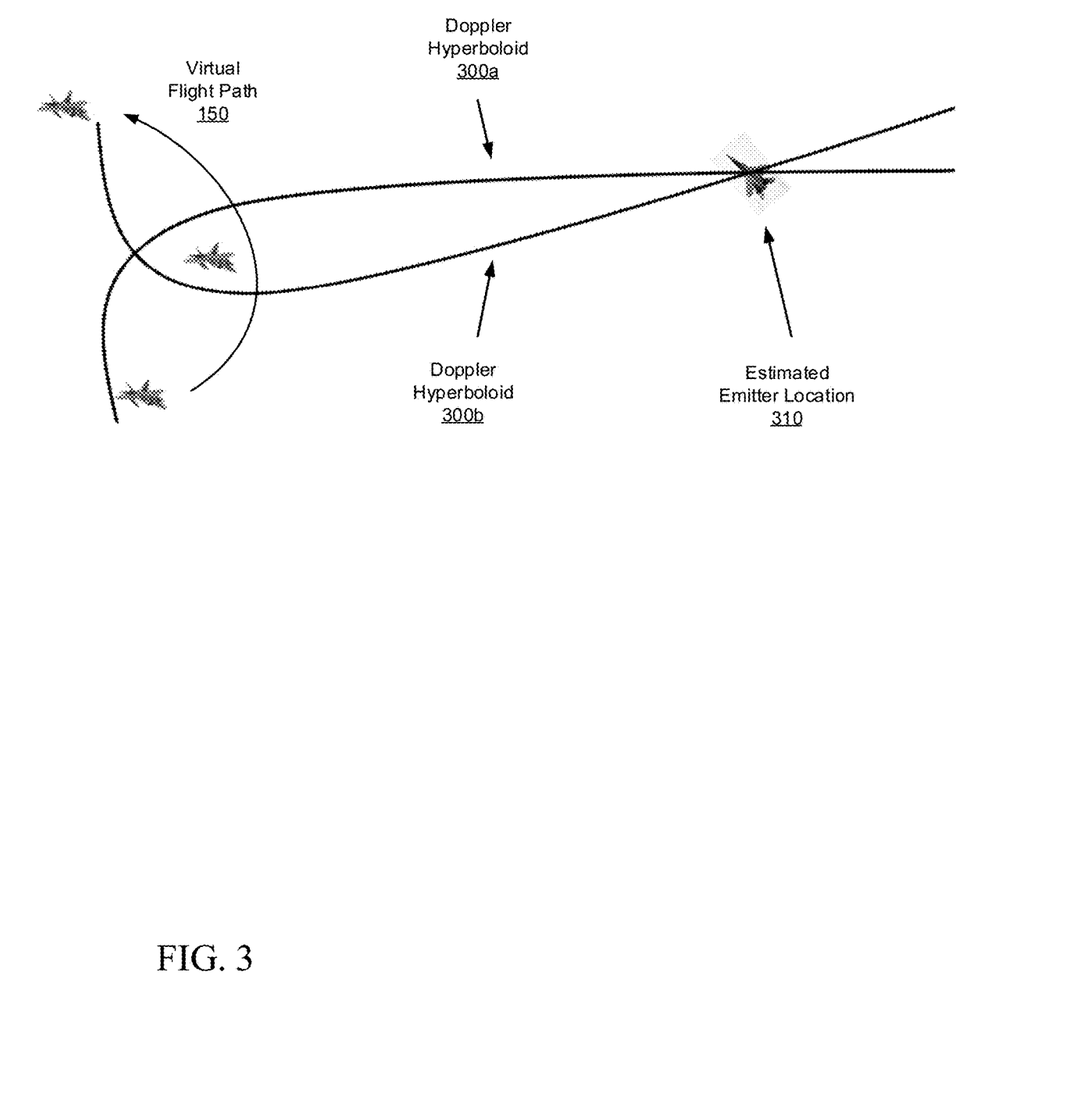
FIG. 3 illustrates intersecting Doppler regions over a virtual flight path, in accordance with certain embodiments of the present disclosure.

The processing platform 170 is configured to locate the emitter based on processing of the TOAs and position data from each collector platform. The Doppler shift of the PRIs of the emitter waveform may be used to define a 3-D hyperboloid, which is shown, for example, as Doppler hyperboloids 300a, 300b, etc., in FIG. 3. Each of the Doppler hyperboloids is associated with the locations of a pair of the collector platforms at a given point in time. An estimated emitter geolocation 310 (also referred to more simply as "location") can be formed based on the intersection of the Doppler hyperboloids. The location estimation is refined, and ambiguities (which are inherent in multi-ship geolocation processing techniques) are reduced or eliminated over time as additional TOA data is collected from the emitter over subsequent dwell periods, as will be described in greater detail below.

Figure 2:
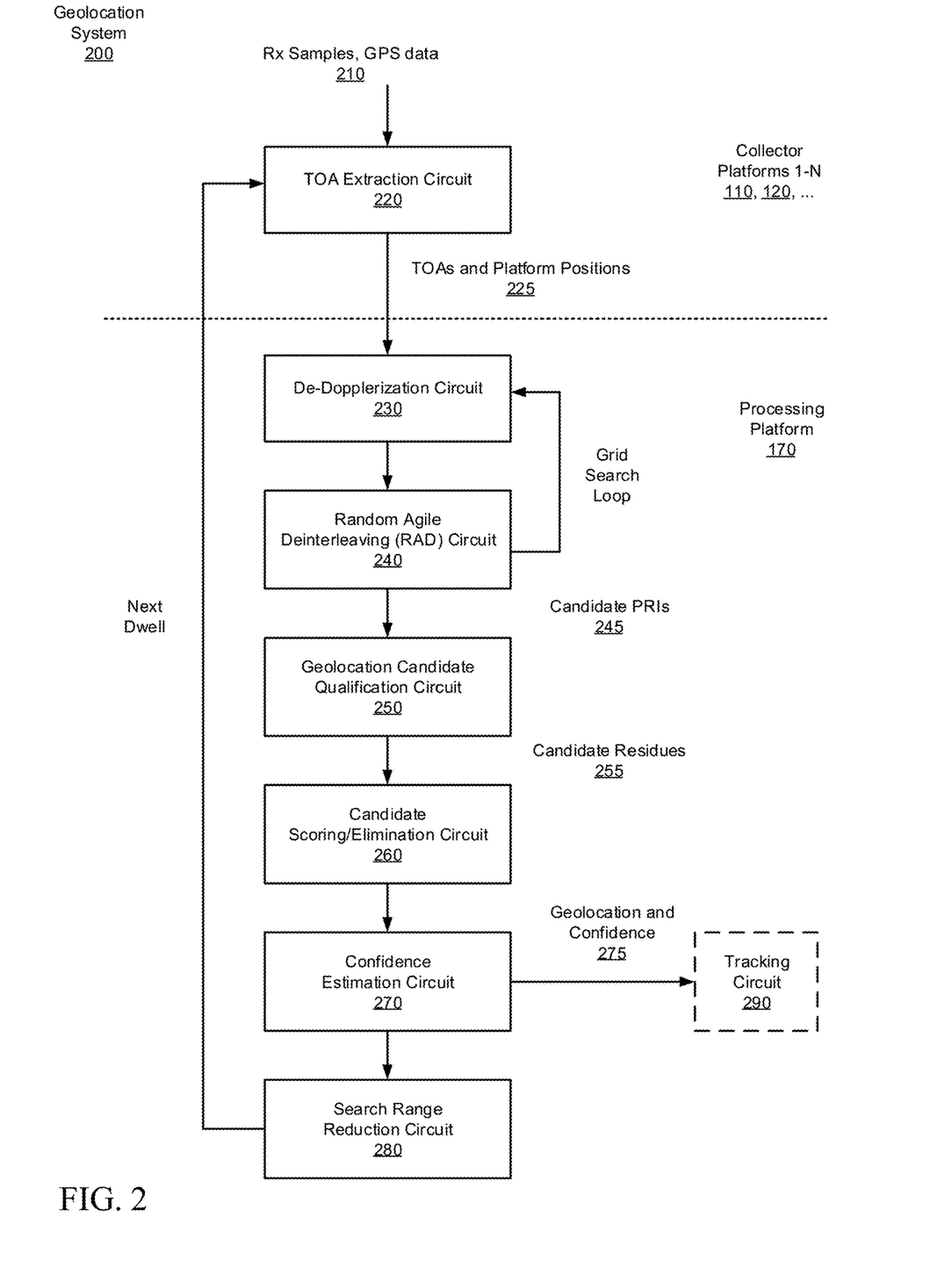
FIG. 2 is a block diagram of the geolocation system, configured in accordance with certain embodiments of the present disclosure.

FIG. 2 is a block diagram of the geolocation system 200, configured in accordance with certain embodiments of the present disclosure. The geolocation system 200 is shown to include a TOA extraction circuit 220 on each of the collector platforms 110, 120, ... 130. The geolocation system 200 is also shown to include, on the processing platform 170, a de-Dopplerization circuit 230, a random agile de-interleaving (RAD) circuit 240, a geolocation candidate qualification circuit 250, a candidate scoring/elimination circuit 260, a confidence estimation circuit 270, a search range reduction circuit 280, and an optional tracking circuit 290.

The TOA extraction circuit 220 is configured to measure the time of arrival of emitter radar pulses received at the multiple collection platforms within a dwell period. These TOAs, along with the location of the platform at the time of reception of the radar pulse, are transmitted from each collection platform to the processing platform 170.

Figure 4:
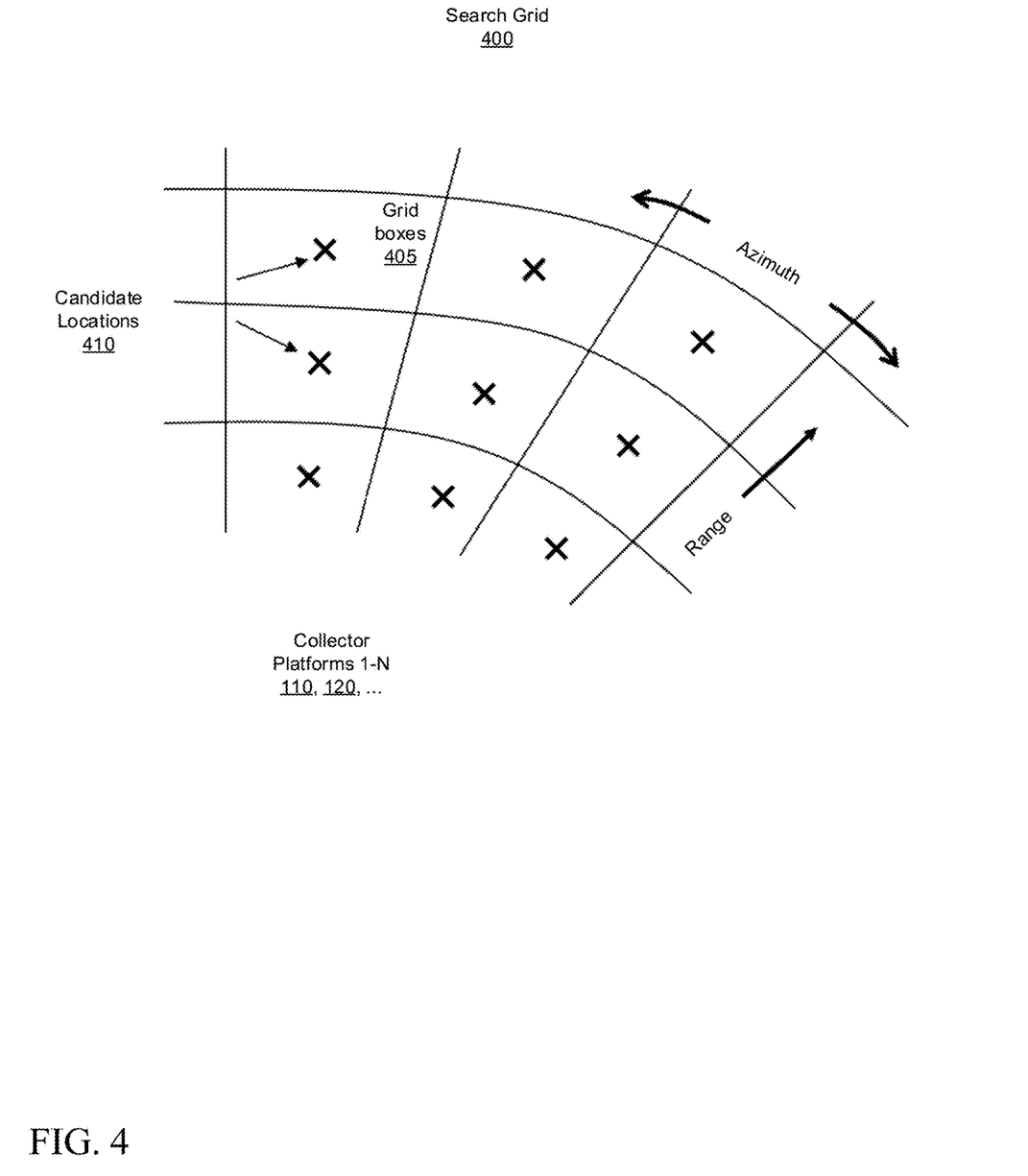
FIG. 4 illustrates search grids, in accordance with certain embodiments of the present disclosure.

Turning now to the processing platform 170, an initial search area or grid 400 is established. The search grid 400 comprises a number of search grid boxes 405, as illustrated in FIG. 4. In some embodiments, the initial search area may be on the order of 120 nautical miles (nm) by 120 nm, and the number of grid boxes may be selected such that the processing burden is reasonable while maintaining a small enough box size to allow the disclosed process to converge on a solution. Candidate locations 410 for the emitter are initially hypothesized to be located within each of the grid boxes, for example at the center of each grid box, although other placements are possible. In some embodiments, an initial altitude for the grid can be hypothesized as the average of the altitudes of the collector platforms. Processing is then performed to refine the hypothesized candidate locations and to eliminate some of the candidates from consideration, as described below.

The de-Dopplerization circuit 230 is configured to de-Dopplerize the measured TOAs of the emitter radar pulses that are received at the multiple collection platforms within a dwell period. The de-Dopplerized TOAs represent the time of transmission (TOT) of the radar pulse, and a TOT set is generated for each of the candidate emitter locations (i.e., in each of the search grid boxes). In some embodiments, a TOT may be generated, for example, according to the following equations:

Pulse travel time=dist(collector platform location, candidate emitter location)/$c$ TOT=measured TOA−pulse travel time where the collector platform location is known (e.g., from the INS of the platform), the candidate emitter location is the hypothesized location in the search grid, dist(x,y) is the distance between x and y, and $c$ is the speed of light.

The random agile de-interleaving (RAD) circuit 240 is configured to calculate a candidate pulse repetition interval (PRI) 245 for each candidate emitter location in each grid, based on the TOTs (de-Dopplerized TOAs). The true PRI of the emitter is unknown and may not even be constant over time. The RAD circuit 240 employs a known coherent time-based technique to calculate the candidate PRIs 245 based on the sequence of pulse TOTs of the emitter waveform, in light of the present disclosure.

The geolocation candidate qualification circuit 250 is configured to update the hypothesized emitter locations over subsequent dwell periods, generating geolocation candidate residues 255, as will be described in greater detail below in connection with FIG. 5.

The candidate scoring/elimination circuit 260 is configured to track candidate locations over the subsequent dwell periods, retaining viable candidates based on residue metrics and locations, and eliminating candidates that become less promising over time, as will be described in greater detail below in connection with FIG. 6.

The confidence estimation circuit 270 is configured to calculate a confidence indicator 275 associated with the identified geolocation candidates. In some embodiments, the confidence indicator is based on a covariance matrix in earth-centered, earth-fixed (ECEF) coordinates computed from the identified geolocation candidate locations. In some such embodiments, the covariance matrix (COV) may be expressed by the following equation:

$$COV = \begin{bmatrix} E((x-\bar{x})^2) & E((x-\bar{x})(y-\bar{y})) & E((x-\bar{x})(z-\bar{z})) \\ E((x-\bar{x})(y-\bar{y})) & E((y-\bar{y})^2) & E((y-\bar{y})(z-\bar{z})) \\ E((x-\bar{x})(z-\bar{z})) & E((y-\bar{y})(z-\bar{z})) & E((z-\bar{z})^2) \end{bmatrix}$$

where E(•) is the expected value, x is the vector of ECEF x coordinates, y is the vector of ECEF y coordinates, z is the vector of ECEF z coordinates, $\bar{x}$ is the average value of x, $\bar{y}$ is the average value of y, and $\bar{z}$ is the average value of z. The covariance matrix represents a probability that the emitter is within a 3-D ellipsoid centered at the mean of the locations of the emitter candidates. In some embodiments, the semi-major and semi-minor axes of the computed ellipsoid are multiplied by a selected scale factor to achieve a desired probability. The scale factor may be expressed as:

scale=$\sqrt{-2\ln(1-P)}$ where P is the desired probability. For example, a scale factor of 1.5 results in a 67.5% probability that the emitter is within the scaled ellipsoid.

The search range reduction circuit 280 is configured to reduce the search range based on the processing of the current dwell period. In some embodiments, the search grid is reduced in area to encompass a region surrounding the remaining viable candidate geolocations with a selected distance margin. In some embodiments, the selected distance margin is in the range of 5 nm to 10 nm, which may be determined empirically.

In some embodiments, the new search range may have a new minimum latitude that is equal to the minimum of all the candidate grid box latitudes, and a new maximum latitude that is equal to the maximum of all the candidate grid box latitudes. Similarly, the new search range may have a new minimum longitude that is equal to the minimum of all the candidate grid box longitudes, and a new maximum longitude that is equal to the maximum of all the candidate grid box longitudes.

In the case of only two candidates, the ellipsoid degenerates into a line (ellipsoid of zero width) between the candidates, and so an arbitrary, but non-zero, minimum width may be chosen, for example, in the range of one to two miles. In the case of only one candidate, an arbitrary circular region may be chosen to surround that candidate with a radius, for example, in the range of one to two miles.

The process then repeats (with the reduced sized search grid), by operating on a new set of TOA extractions from the next dwell period. The search grid box size is reduced commensurate with the reduced overall grid size.

In some embodiments, an optional tracking circuit 290 is configured to track the viable candidate emitter locations over time, based in part on the confidence estimates, using any suitable tracking algorithms, in light of the present disclosure.

Figure 5:
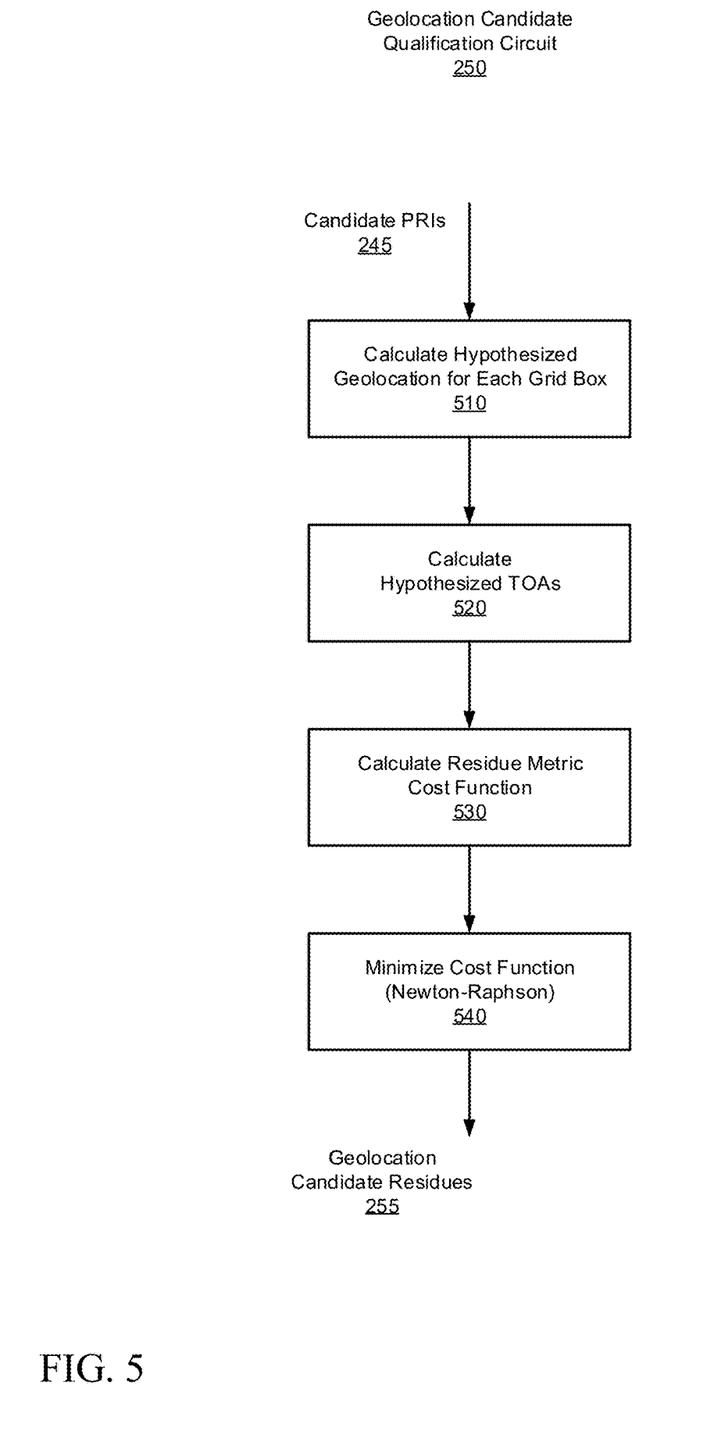
FIG. 5 is a block diagram of a geolocation candidate calculation circuit, configured in accordance with certain embodiments of the present disclosure.

FIG. 5 is a block diagram of the geolocation candidate qualification circuit 250, configured in accordance with certain embodiments of the present disclosure. The geolocation candidate qualification circuit 250 is shown to include a number of modules, the operations of which are described below.

Module 510 is configured to update the initial hypothesized emitter locations based on the candidate PRIs.

Module 520 is configured to calculate hypothesized TOAs based on the updated hypothesized emitter locations and on the known locations of the platforms. In some embodiments, the hypothesized TOAs may be calculated by the following equation:

Pulse travel time=dist(collector platform location, updated hypothesized emitter location)/$c$ hypothesized TOA=TOT+pulse travel time Module 530 is configured to calculate residue metrics. The residues represent a cost function based on a difference between the measured TOAs and the hypothesized TOAs. In some embodiments, the residue may be calculated as:

residue=average(abs(measured TOAs−hypothesized TOAs))

Module 540 is configured to minimize the residues for each of the updated hypothesized emitter locations. The residue cost function may be minimized by modifying the hypothesized location of the emitter (which in turn modifies the hypothesized TOAs) according to a minimization algorithm such as, for example, the Newton-Raphson Algorithm, although other minimization algorithms may be used in light of the present disclosure. The minimized geolocation candidate residues 255 are provided as output.

Figure 6:
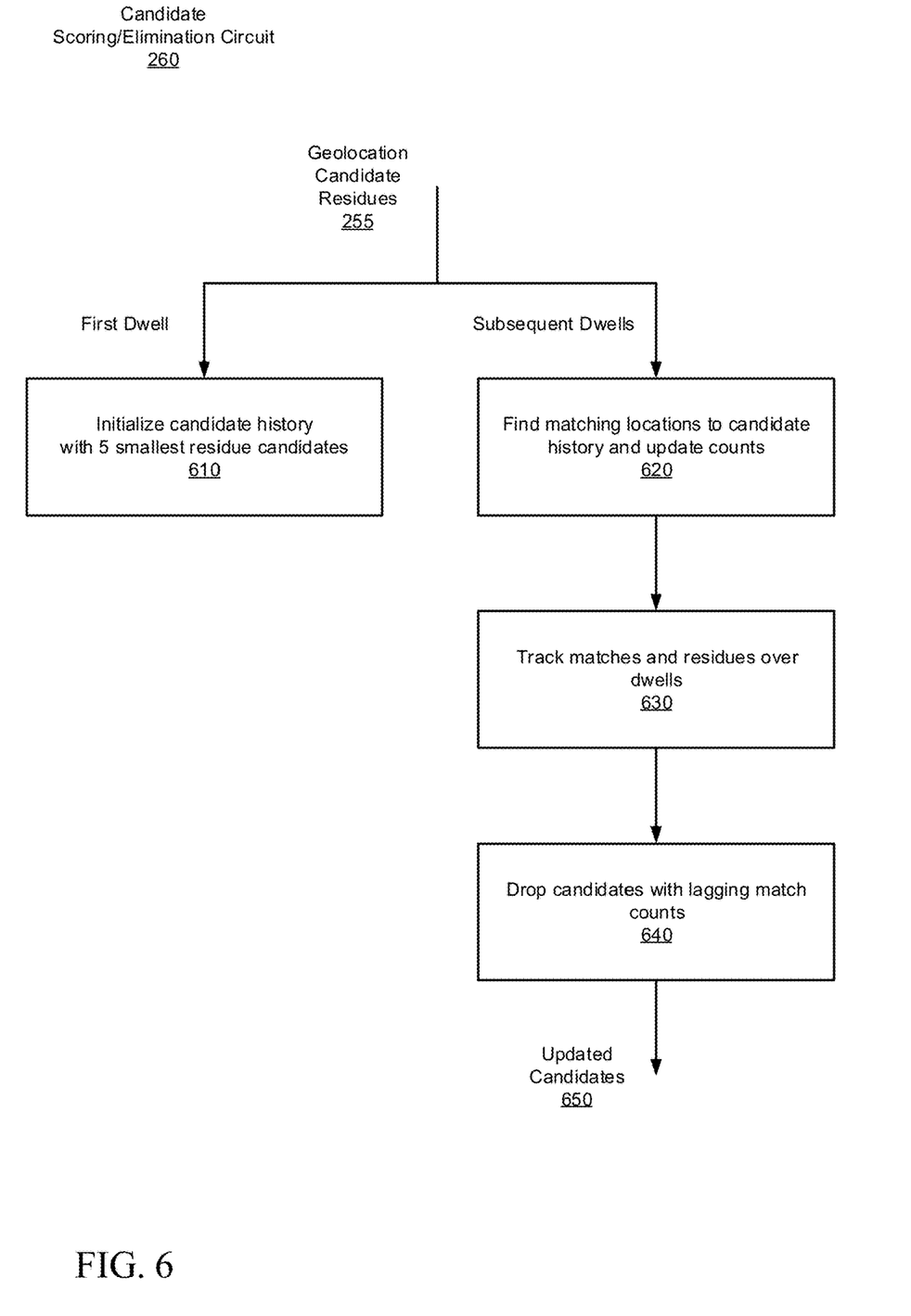
FIG. 6 is a block diagram of a candidate scoring/elimination circuit, configured in accordance with certain embodiments of the present disclosure.

FIG. 6 is a block diagram of a candidate scoring/elimination circuit 260, configured in accordance with certain embodiments of the present disclosure. The candidate scoring/elimination circuit 260 is shown to include a number of modules, the operations of which are described below.

Module 610 is configured to create a geolocation candidate history, on the first dwell period, and to initialize that history with a selected number of the updated hypothesized emitter locations with the smallest residue metrics. In some embodiments, the selected number is five (which may be determined empirically), and so the hypothesized emitter locations with the five smallest residue metrics are used to initialize the history.

Module 620 is configured to update the geolocation candidate history for subsequent dwell periods. The update is based on processing of TOA collections received at the multiple platforms, as previously described, during each new current dwell period after the initial dwell. New candidates with the smallest residues (e.g., the five smallest residues) from the current dwell period are identified and associated with the existing candidates in the candidate history by closeness in location. A count of the number of times a candidate has been matched is updated on each dwell.

Module 630 is configured to track, over the subsequent dwell periods, the identified geolocation candidates that are associated with the greatest match counts and the smallest residues.

Module 640 is configured to remove one or more of the identified geolocation candidates from the geolocation candidate history if the match count of the identified geolocation candidate lags a largest of the match counts of the geolocation candidate history by more than a selected number of counts. In some embodiments, the selected number of counts is two. Module 640 thus provides updated candidates 650, for example in the form of an updated geolocation candidate history, for further processing.

Methodology

Figure 7:
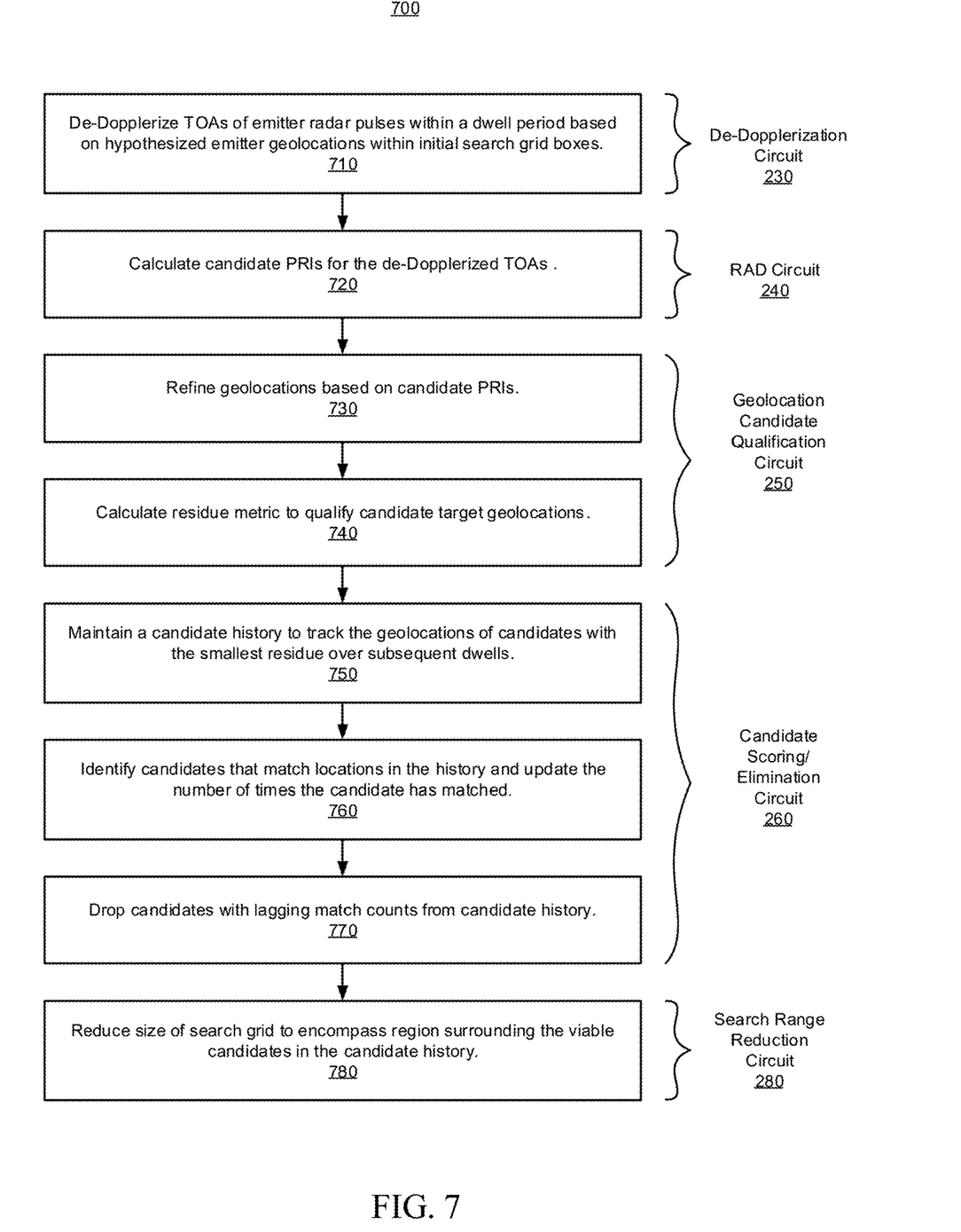
FIG. 7 is a flowchart illustrating a methodology for emitter geolocation, in accordance with certain other embodiments of the present disclosure.

FIG. 7 is a flowchart illustrating a methodology for emitter geolocation, in accordance with certain other embodiments of the present disclosure. As can be seen, example method 700 includes a number of phases and sub-processes, the sequence of which may vary from one embodiment to another. However, when considered in the aggregate, these phases and sub-processes form a process for multi-ship coherent geolocation of airborne emitters, in accordance with certain of the embodiments disclosed herein. These embodiments can be implemented, for example using the system architecture illustrated in FIGS. 1, 2, 5, and 6, as described above. However other system architectures can be used in other embodiments, as will be apparent in light of this disclosure. To this end, the correlation of the various functions shown in FIG. 7 to the specific components illustrated in FIGS. 1, 2, 5, and 6 is not intended to imply any structural and/or use limitations. Rather other embodiments may include, for example, varying degrees of integration wherein multiple functionalities are effectively performed by one system. Numerous variations and alternative configurations will be apparent in light of this disclosure.

As illustrated in FIG. 7, in one embodiment method 700 commences, at operation 710, by de-Dopplerizing measured times of arrival (TOAs) of emitter radar pulses received at multiple collection platforms within a dwell period, to generate de-Dopplerized TOAs associated with initial hypothesized emitter geolocations in each of a plurality of search grid boxes.

Next, at operation 720, random agile de-interleaving is employed to calculate candidate pulse repetition intervals (PRIs) for each of the de-Dopplerized TOAs. At operation 730, the initial hypothesized emitter geolocations are updated/refined based on the candidate PRIs.

At operation 740, hypothesized TOAs are calculated based on the updated hypothesized emitter locations and on known locations of the platforms, and residues for each of the updated hypothesized emitter locations are minimized. The residues represent a cost function, based on a difference between the measured TOAs and the hypothesized TOAs, which are used to qualify candidate target geolocations.

At operation 750, a geolocation candidate history is initialized with a selected number of the updated hypothesized emitter locations associated with the smallest residues. The candidate history is maintained/updated by processing collections received at the multiple platforms during subsequent dwells according to the operations described above.

At operation 760, geolocation candidates are identified from the current candidate history that match geolocation candidates from the previous candidate history, the matching based on the locations associated with the geolocation candidates. A match count of the number of matches for each of the identified geolocation candidates is updated.

At operation 770, the identified geolocation candidates that are associated with match counts that exceed a first selected threshold and are associated with residues that do not exceed a second selected threshold are tracked over subsequent dwell periods. These candidates are removed from the history if the match count of the candidate lags the largest of the match counts in the history by more than a selected number of counts.

At operation 780, the area of the search grid is reduced to encompass the identified (e.g., viable) geolocation candidates from the geolocation candidate history by a selected distance margin.

Of course, in some embodiments, additional operations may be performed, as previously described in connection with the system. These additional operations may include, for example, calculating a confidence indicator associated with the identified geolocation candidates, the confidence indicator based on a covariance matrix of earth-centered, earth-fixed (ECEF) coordinates of the identified geolocation candidates.

Example Platforms

Figure 8:
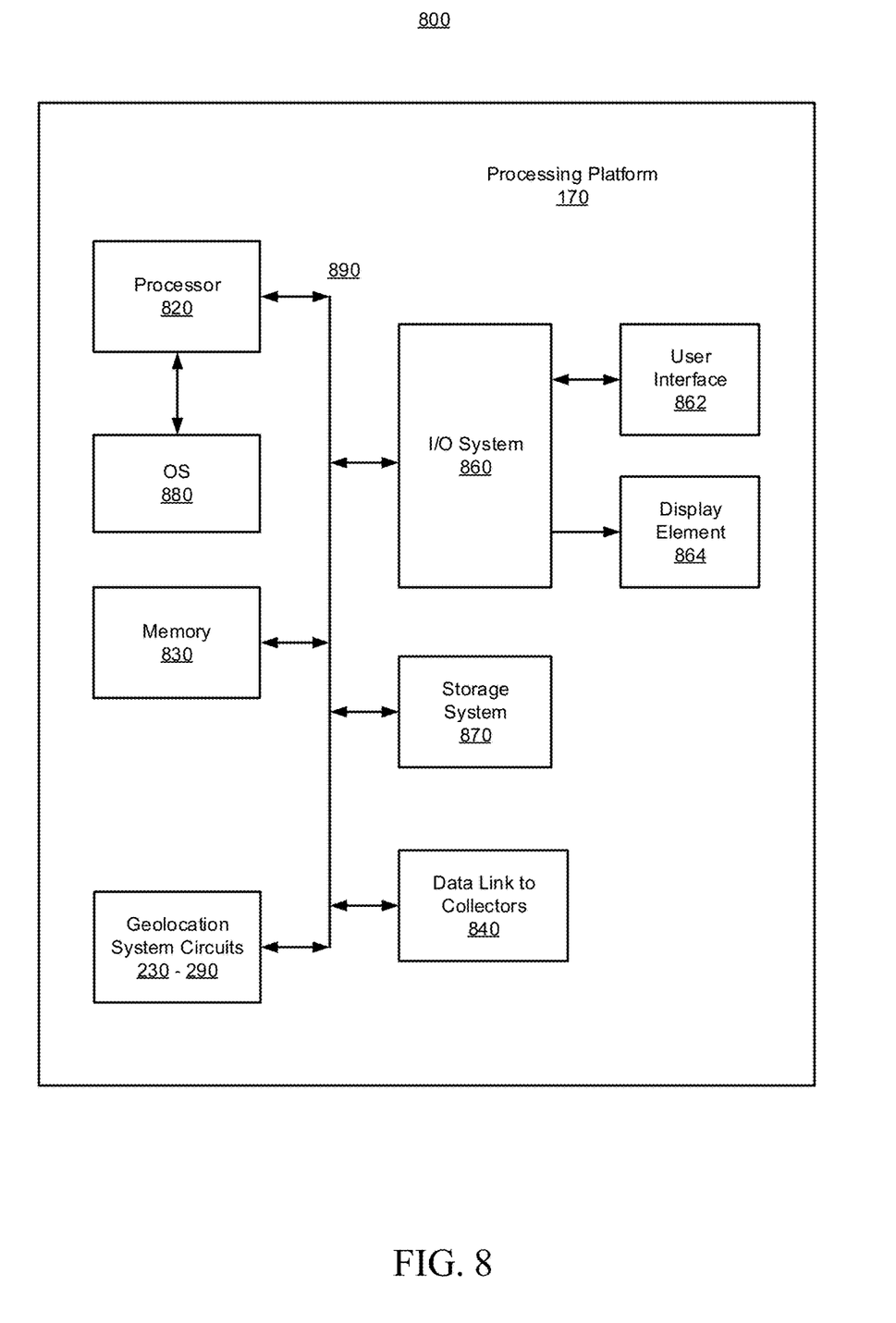
FIG. 8 is a block diagram schematically illustrating a platform employing the disclosed geolocation system, in accordance with certain embodiments of the present disclosure.

FIG. 8 is a block diagram 800 schematically illustrating a processing platform 170 employing the disclosed geolocation system, in accordance with certain embodiments of the present disclosure. In some embodiments, platform 810 may be hosted on, or otherwise be incorporated into an aircraft (e.g., one of the collector platforms 110, 120, 130, or another aircraft), the electronic systems of the aircraft, a ground station, or any other suitable platform.

In some embodiments, platform 810 may comprise any combination of a processor 820, a memory 830, an input/output (I/O) system 860, a user interface 862, a display element 864, a storage system 870, geolocation system circuits 230-290, and communications data link 840 (for communication with collector platforms 110, 120, 130, . . . ). As can be further seen, a bus and/or interconnect 890 is also provided to allow for communication between the various components listed above and/or other components not shown. Other componentry and functionality not reflected in the block diagram of FIG. 8 will be apparent in light of this disclosure, and it will be appreciated that other embodiments are not limited to any particular hardware configuration.

Processor 820 can be any suitable processor, and may include one or more coprocessors or controllers, such as an audio processor, a graphics processing unit, or hardware accelerator, to assist in control and processing operations associated with platform 170. In some embodiments, the processor 820 may be implemented as any number of processor cores. The processor (or processor cores) may be any type of processor, such as, for example, a microprocessor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. Processor 820 may be implemented as a complex instruction set computer (CISC) or a reduced instruction set computer (RISC) processor.

Memory 830 can be implemented using any suitable type of digital storage including, for example, flash memory and/or random access memory (RAM). In some embodiments, the memory 830 may include various layers of memory hierarchy and/or memory caches as are known to those of skill in the art. Memory 830 may be implemented as a volatile memory device such as, but not limited to, a RAM, dynamic RAM (DRAM), or static RAM (SRAM) device. Storage system 870 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device.

Processor 820 may be configured to execute an Operating System (OS) 880 which may comprise any suitable operating system, such as Google Android (Google Inc., Mountain View, Calif.), Microsoft Windows (Microsoft Corp., Redmond, Wash.), Apple OS X (Apple Inc., Cupertino, Calif.), Linux, or a real-time operating system (RTOS). As will be appreciated in light of this disclosure, the techniques provided herein can be implemented without regard to the particular operating system provided in conjunction with platform 170, and therefore may also be implemented using any suitable existing or subsequently-developed platform.

I/O system 860 may be configured to interface between various I/O devices and other components of platform 170. I/O devices may include, but not be limited to, user interface 862 and display element 864. User interface 862 may include other devices (not shown) such as a touchpad, keyboard, mouse, microphone and speaker, trackball or scratch pad, and camera. I/O system 860 may include a graphics subsystem configured to perform processing of images for rendering on the display element 864. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 820 or any chipset of platform 170.

It will be appreciated that in some embodiments, some of the various components of platform 170 may be combined or integrated in a system-on-a-chip (SoC) architecture. In some embodiments, the components may be hardware components, firmware components, software components or any suitable combination of hardware, firmware or software.

Geolocation system 200 is configured to perform geolocation of airborne pulsed radar emitters using coherent processing of radar pulses collected by multiple spatially separated airborne platforms which simulate a virtual flight path, as described previously. Geolocation system 200 may include any or all of the circuits/components illustrated in FIGS. 2, 5, and 6 (e.g., circuits 230-290) as described above. These components can be implemented or otherwise used in conjunction with a variety of suitable software and/or hardware that is coupled to or that otherwise forms a part of platform 170. These components can additionally or alternatively be implemented or otherwise used in conjunction with user I/O devices that are capable of providing information to, and receiving information and commands from, a user.

Various embodiments of platform 170 may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, causes one or more of the methodologies disclosed herein to be implemented. Other componentry and functionality not reflected in the illustrations will be apparent in light of this disclosure, and it will be appreciated that other embodiments are not limited to any particular hardware or software configuration. Thus, in other embodiments platform 170 may comprise additional, fewer, or alternative subcomponents as compared to those included in the example embodiment of FIG. 8.

Figure 9:
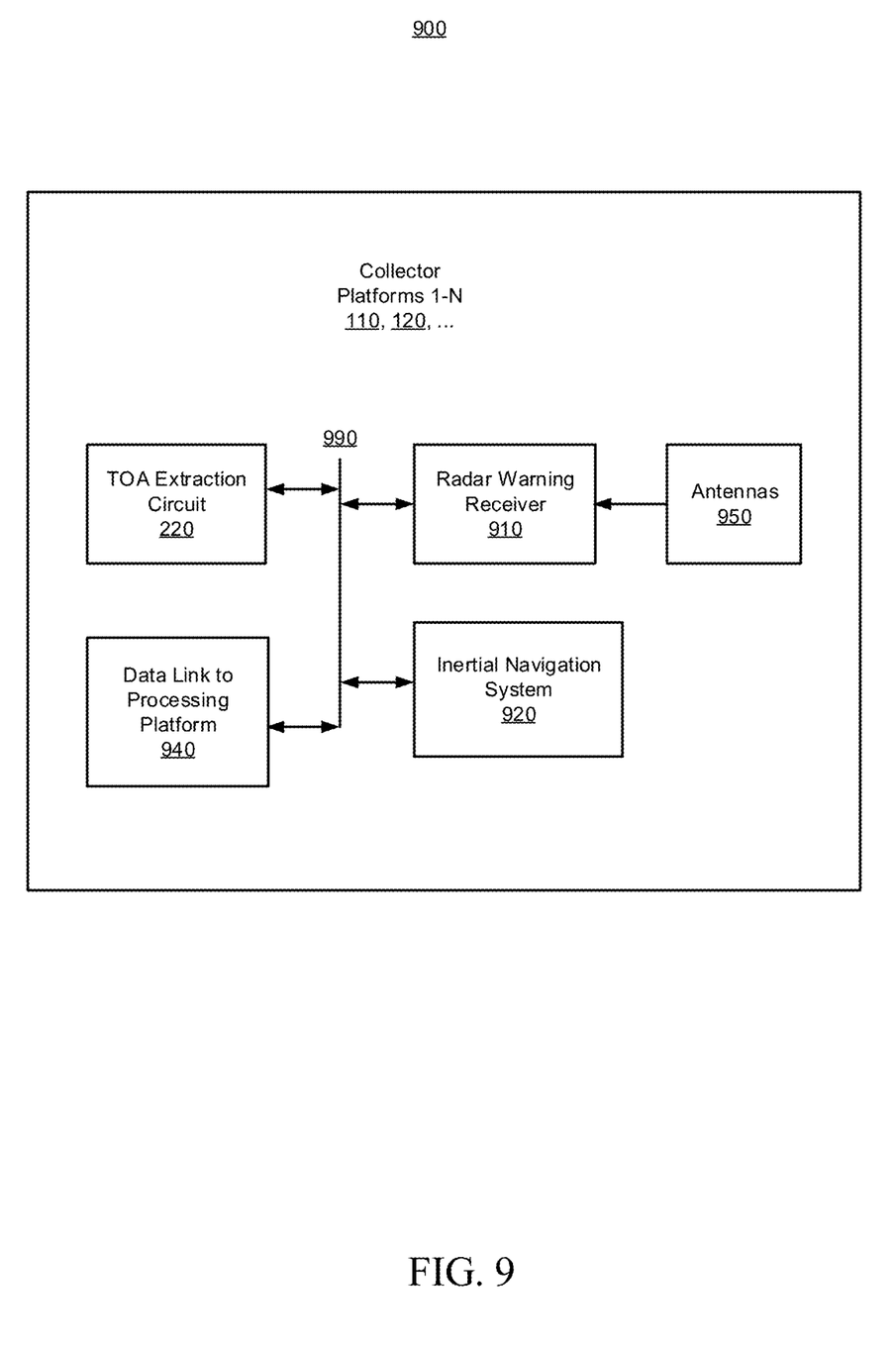
FIG. 9 is a block diagram schematically illustrating a collector platform for use with the disclosed geolocation system, in accordance with certain embodiments of the present disclosure.

FIG. 9 is a block diagram 900 schematically illustrating collector aircraft platforms 110, 120, . . . 130, to provide data to the disclosed geolocation system, in accordance with certain embodiments of the present disclosure.

In some embodiments, collector aircraft platforms 110, 120, . . . 130 may comprise any combination of a TOA extraction circuit 220, radar warning receiver 910, antennas 950, inertial navigation system 920 (which may be an embedded GPS/INS system or EGI), and communications data link 940 (for communication with processing platform 170). As can be further seen, a bus and/or interconnect 990 is also provided to allow for communication between the various components listed above and/or other components not shown. Other componentry and functionality not reflected in the block diagram of FIG. 9 will be apparent in light of this disclosure, and it will be appreciated that other embodiments are not limited to any particular hardware configuration.

Collector aircraft platforms 110, 120, . . . 130 are configured to receive/collect radar pulse from emitter platform 140, measure the TOAs of those pulses, and transmit that information (along with the self-position of the collector platform) to the processing platform 170, over data link 940, as described previously. In some embodiments, the processing platform 170 may be hosted on, or otherwise be incorporated into one of the collector aircraft platforms.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The aforementioned non-transitory computer readable medium may be any suitable medium for storing digital information, such as a hard drive, a server, a flash memory, and/or random access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). In some embodiments, the hardware may be modeled or developed using hardware description languages such as, for example Verilog or VHDL. Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CD-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, or one or more embedded routines configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads or parallel processes in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), computers, and other processor-based or functional systems. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

One example embodiment of the present disclosure provides a system for emitter geolocation, the system comprising: a de-dopplerization circuit to de-dopplerize measured times of arrival (TOAs) of emitter radar pulses received at multiple collection platforms within a dwell period, to generate de-dopplerized TOAs associated with initial hypothesized emitter geolocations in each of a plurality of search grid boxes of a search grid; a Random Agile Deinterleaving circuit to calculate candidate pulse repetition intervals (PRIs) for each of the de-dopplerized TOAs; a geolocation candidate calculation circuit to update the initial hypothesized emitter geolocations based on the candidate PRIs, calculate hypothesized TOAs based on the updated hypothesized emitter geolocations and on known locations of the collection platforms, and minimize residues for each of the updated hypothesized emitter geolocations, wherein each residue represents a cost function based on a difference between the measured TOAs and the hypothesized TOAs; and a candidate scoring and elimination circuit to create a geolocation candidate history initialized with a selected number of the updated hypothesized emitter geolocations associated with the smallest residues.

In some cases, the dwell period is a first dwell period and the candidate scoring and elimination circuit is further to: update the geolocation candidate history from a previous candidate history to a current candidate history based on processing of collections received at the multiple collection platforms during a second dwell period; identify geolocation candidates from the current candidate history that match geolocation candidates from the previous candidate history, the match based on locations associated with the geolocation candidates; and update a match count of the number of matches for each of the identified geolocation candidates.

In some such cases, the candidate scoring and elimination circuit is further to: track, over subsequent dwell periods, the identified geolocation candidates that are associated with match counts that exceed a first selected threshold and are associated with residues that are less than a second selected threshold; and remove one or more of the identified geolocation candidates from the geolocation candidate history if the match count of the identified geolocation candidate lags a largest of the match counts of the geolocation candidate history by more than a selected number of counts.

In some such cases, the system further comprises a confidence estimation circuit to calculate a confidence indicator associated with the identified geolocation candidates, the confidence indicator based on a covariance matrix of earth-centered, earth-fixed (ECEF) coordinates of the identified geolocation candidates.

In some such cases, the search grid has an area, further comprising a search range reduction circuit to reduce the area of the search grid to encompass the identified geolocation candidates from the geolocation candidate history by a selected distance margin.

In some such cases, the selected number of the updated hypothesized emitter geolocations is five, the selected number of counts is two, and the selected distance margin is in the range of 5 nautical miles to 10 nautical miles.

Another example embodiment of the present disclosure provides a computer program product including one or more machine-readable mediums encoded with instructions that when executed by one or more processors cause a process to be carried out for emitter geolocation, the process comprising: de-dopplerizing measured times of arrival (TOAs) of emitter radar pulses received at multiple collection platforms within a dwell period, to generate de-dopplerized TOAs associated with initial hypothesized emitter geolocations in each of a plurality of search grid boxes of a search grid; calculating candidate pulse repetition intervals (PRIs) for each of the de-dopplerized TOAs; updating the initial hypothesized emitter geolocations based on the candidate PRIs; calculating hypothesized TOAs based on the updated hypothesized emitter geolocations and on known locations of the collection platforms; minimizing residues for each of the updated hypothesized emitter geolocations, wherein each residue represents a cost function based on a difference between the measured TOAs and the hypothesized TOAs; and creating a geolocation candidate history initialized with a selected number of the updated hypothesized emitter geolocations associated with the smallest residues.

In some cases, the dwell period is a first dwell period, the process further comprising: updating the geolocation candidate history, according to the process of claim 7, from a previous candidate history to a current candidate history, based on collections received at the multiple collection platforms during a second dwell period; identifying geolocation candidates from the current candidate history that match geolocation candidates from the previous candidate history, the matching based on locations associated with the geolocation candidates; and updating a match count of the number of matches for each of the identified geolocation candidates.

In some such cases, the process further comprises: tracking, over subsequent dwell periods, the identified geolocation candidates that are associated with match counts that exceed a first selected threshold and are associated with residues that are less than a second selected threshold; and removing one or more of the identified geolocation candidates from the geolocation candidate history if the match count of the identified geolocation candidate lags a largest of the match counts of the geolocation candidate history by more than a selected number of counts.

In some such cases, the process further comprises calculating a confidence indicator associated with the identified geolocation candidates, the confidence indicator based on a covariance matrix of earth-centered, earth-fixed (ECEF) coordinates of the identified geolocation candidates.

In some such cases, the search grid has an area, the process further comprising reducing the area of the search grid to encompass the identified geolocation candidates from the geolocation candidate history by a selected distance margin.

In some such cases, the selected number of the updated hypothesized emitter geolocations is five, the selected number of counts is two, and the selected distance margin is in the range of 5 nautical miles to 10 nautical miles.

In some cases, the calculating of the candidate PRIs employs Random Agile Deinterleaving.

Another example embodiment of the present disclosure provides a method for emitter geolocation, the method comprising: de-dopplerizing, by a processor-based system, measured times of arrival (TOAs) of emitter radar pulses received at multiple collection platforms within a dwell period, to generate de-dopplerized TOAs associated with initial hypothesized emitter geolocations in each of a plurality of search grid boxes of a search grid; calculating, by the processor-based system, candidate pulse repetition intervals (PRIs) for each of the de-dopplerized TOAs; updating, by the processor-based system, the initial hypothesized emitter geolocations based on the candidate PRIs; calculating, by the processor-based system, hypothesized TOAs based on the updated hypothesized emitter geolocations and on known locations of the collection platforms; minimizing, by the processor-based system, residues for each of the updated hypothesized emitter geolocations, wherein each residue represents a cost function based on a difference between the measured TOAs and the hypothesized TOAs; and creating, by the processor-based system, a geolocation candidate history initialized with a selected number of the updated hypothesized emitter geolocations associated with the smallest residues.

In some cases, the dwell period is a first dwell period, the method further comprising: updating the geolocation candidate history, according to the process of claim 14, from a previous candidate history to a current candidate history, based on collections received at the multiple collection platforms during a second dwell period; identifying geolocation candidates from the current candidate history that match geolocation candidates from the previous candidate history, the matching based on locations associated with the geolocation candidates; and updating a match count of the number of matches for each of the identified geolocation candidates.

In some such cases, the method further comprises: tracking, over subsequent dwell periods, the identified geolocation candidates that are associated with match counts that exceed a first selected threshold and are associated with residues that are less than a second selected threshold; and removing one or more of the identified geolocation candidates from the geolocation candidate history if the match count of the identified geolocation candidate lags a largest of the match counts of the geolocation candidate history by more than a selected number of counts.

In some such cases, the method further comprises: calculating a confidence indicator associated with the identified geolocation candidates, the confidence indicator based on a covariance matrix of earth-centered, earth-fixed (ECEF) coordinates of the identified geolocation candidates.

In some such cases, the search grid box has an area, further comprising reducing the area of the search grid to encompass the identified geolocation candidates from the geolocation candidate history by a selected distance margin.

In some such cases, the selected number of the updated hypothesized emitter geolocations is five, the selected number of counts is two, and the selected distance margin is in the range of 5 nautical miles to 10 nautical miles.

In some cases, the calculating of the candidate PRIs employs Random Agile Deinterleaving.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A system for emitter geolocation, the system comprising:
    a de-Dopplerization circuit to de-Dopplerize measured times of arrival (TOAs) of emitter radar pulses received at multiple collection platforms within a dwell period, to generate de-Dopplerized TOAs associated with initial hypothesized emitter geolocations in each of a plurality of search grid boxes of a search grid;
    a random agile de-interleaving circuit to calculate candidate pulse repetition intervals (PRIs) for each of the de-Dopplerized TOAs;
    a geolocation candidate calculation circuit to update the initial hypothesized emitter geolocations based on the candidate PRIs, calculate hypothesized TOAs based on the updated hypothesized emitter geolocations and on known locations of the collection platforms, and minimize residues for each of the updated hypothesized emitter geolocations, wherein each residue represents a cost function based on a difference between the measured TOAs and the hypothesized TOAs; and
    a candidate scoring and elimination circuit to create a geolocation candidate history initialized with a selected number of the updated hypothesized emitter geolocations associated with the smallest residues.

2. The system of claim 1, wherein the dwell period is a first dwell period and the candidate scoring and elimination circuit is further configured to:
    update the geolocation candidate history from a previous candidate history to a current candidate history based on processing of collections received at the multiple collection platforms during a second dwell period;
    identify geolocation candidates from the current candidate history that match geolocation candidates from the previous candidate history, the match based on locations associated with the geolocation candidates; and
    update a match count of the number of matches for each of the identified geolocation candidates.

3. The system of claim 2, wherein the candidate scoring and elimination circuit is further to:
    track, over subsequent dwell periods, the identified geolocation candidates that are associated with match counts that exceed a first selected threshold and are associated with residues that are less than a second selected threshold; and
    remove one or more of the identified geolocation candidates from the geolocation candidate history if the match count of the identified geolocation candidate lags a largest of the match counts of the geolocation candidate history by more than a selected number of counts.

4. The system of claim 2, further comprising a confidence estimation circuit to calculate a confidence indicator associated with the identified geolocation candidates, the confidence indicator based on a covariance matrix of earth-centered, earth-fixed (ECEF) coordinates of the identified geolocation candidates.

5. The system of claim 2, wherein the search grid has an area, further comprising a search range reduction circuit to reduce the area of the search grid to encompass the identified geolocation candidates from the geolocation candidate history by a selected distance margin.

6. The system of claim 5, wherein the selected number of the updated hypothesized emitter geolocations is five, the selected number of counts is two, and the selected distance margin is in the range of 5 nautical miles to 10 nautical miles.

7. A computer program product including one or more machine-readable mediums encoded with instructions that when executed by one or more processors cause a process to be carried out for emitter geolocation, the process comprising:
    de-Dopplerizing measured times of arrival (TOAs) of emitter radar pulses received at multiple collection platforms within a dwell period, to generate de-Dopplerized TOAs associated with initial hypothesized emitter geolocations in each of a plurality of search grid boxes of a search grid;
    calculating candidate pulse repetition intervals (PRIs) for each of the de-Dopplerized TOAs;
    updating the initial hypothesized emitter geolocations based on the candidate PRIs;
    calculating hypothesized TOAs based on the updated hypothesized emitter geolocations and on known locations of the collection platforms;
    minimizing residues for each of the updated hypothesized emitter geolocations, wherein each residue represents a cost function based on a difference between the measured TOAs and the hypothesized TOAs; and
    creating a geolocation candidate history initialized with a selected number of the updated hypothesized emitter geolocations associated with the smallest residues.

8. The computer program product of claim 7, wherein the dwell period is a first dwell period, the process further comprising:
    updating the geolocation candidate history, from a previous candidate history to a current candidate history, based on collections received at the multiple collection platforms during a second dwell period;
    identifying geolocation candidates from the current candidate history that match geolocation candidates from the previous candidate history, the matching based on locations associated with the geolocation candidates; and
    updating a match count of the number of matches for each of the identified geolocation candidates.

9. The computer program product of claim 8, the process further comprising:

tracking, over subsequent dwell periods, the identified geolocation candidates that are associated with match counts that exceed a first selected threshold and are associated with residues that are less than a second selected threshold; and removing one or more of the identified geolocation candidates from the geolocation candidate history if the match count of the identified geolocation candidate lags a largest of the match counts of the geolocation candidate history by more than a selected number of counts.

10. The computer program product of claim 9, the process further comprising calculating a confidence indicator associated with the identified geolocation candidates, the confidence indicator based on a covariance matrix of earth-centered, earth-fixed (ECEF) coordinates of the identified geolocation candidates.

11. The computer program product of claim 9, wherein the search grid has an area, the process further comprising reducing the area of the search grid to encompass the identified geolocation candidates from the geolocation candidate history by a selected distance margin.

12. The computer program product of claim 11, wherein the selected number of the updated hypothesized emitter geolocations is five, the selected number of counts is two, and the selected distance margin is in the range of 5 nautical miles to 10 nautical miles.

13. The computer program product of claim 7, wherein the calculating of the candidate PRIs employs random agile de-interleaving.

14. A method for emitter geolocation, the method comprising:
de-Dopplerizing, by a processor-based system, measured times of arrival (TOAs) of emitter radar pulses received at multiple collection platforms within a dwell period, to generate de-Dopplerized TOAs associated with initial hypothesized emitter geolocations in each of a plurality of search grid boxes of a search grid;
calculating, by the processor-based system, candidate pulse repetition intervals (PRIs) for each of the de-Dopplerized TOAs;
updating, by the processor-based system, the initial hypothesized emitter geolocations based on the candidate PRIs;
calculating, by the processor-based system, hypothesized TOAs based on the updated hypothesized emitter geolocations and on known locations of the collection platforms;
minimizing, by the processor-based system, residues for each of the updated hypothesized emitter geolocations, wherein each residue represents a cost function based on a difference between the measured TOAs and the hypothesized TOAs; and
creating, by the processor-based system, a geolocation candidate history initialized with a selected number of the updated hypothesized emitter geolocations associated with the smallest residues.

15. The method of claim 14, wherein the dwell period is a first dwell period, the method further comprising:
updating the geolocation candidate history, from a previous candidate history to a current candidate history, based on collections received at the multiple collection platforms during a second dwell period;
identifying geolocation candidates from the current candidate history that match geolocation candidates from the previous candidate history, the matching based on locations associated with the geolocation candidates; and
updating a match count of the number of matches for each of the identified geolocation candidates.

16. The method of claim 15, further comprising:
tracking, over subsequent dwell periods, the identified geolocation candidates that are associated with match counts that exceed a first selected threshold and are associated with residues that are less than a second selected threshold; and
removing one or more of the identified geolocation candidates from the geolocation candidate history if the match count of the identified geolocation candidate lags a largest of the match counts of the geolocation candidate history by more than a selected number of counts.

17. The method of claim 16, further comprising calculating a confidence indicator associated with the identified geolocation candidates, the confidence indicator based on a covariance matrix of earth-centered, earth-fixed (ECEF) coordinates of the identified geolocation candidates.

18. The method of claim 16, wherein the search grid box has an area, further comprising reducing the area of the search grid to encompass the identified geolocation candidates from the geolocation candidate history by a selected distance margin.

19. The method of claim 18, wherein the selected number of the updated hypothesized emitter geolocations is five, the selected number of counts is two, and the selected distance margin is in the range of 5 nautical miles to 10 nautical miles.

20. The method of claim 14, wherein the calculating of the candidate PRIs employs random agile de-interleaving.

* * * * *